United States Patent
Huang

(10) Patent No.: US 8,662,465 B2
(45) Date of Patent: Mar. 4, 2014

(54) TILTABLE NOTEBOOK-COMPUTER COOLING PAD WITH TABLET-COMPUTER BRACKET

(76) Inventor: Cheng Yu Huang, Taipei (TW)

( * ) Notice: Subject to any disclaimer, the term of this patent is extended or adjusted under 35 U.S.C. 154(b) by 0 days.

(21) Appl. No.: 13/344,810

(22) Filed: Jan. 6, 2012

(65) Prior Publication Data

US 2013/0175018 A1   Jul. 11, 2013

(51) Int. Cl.
*A47G 29/00*       (2006.01)

(52) U.S. Cl.
USPC ..... 248/371; 248/395; 248/176.1; 248/176.3; 361/679.46

(58) Field of Classification Search
USPC ............. 248/688, 133, 371, 395, 397, 274.1, 248/309.1, 917, 923, 121, 122.1, 176.1, 248/176.3, 220.21, 220.22; 361/679.02, 361/679.21, 679.48, 679.49, 679.46
See application file for complete search history.

(56) References Cited

U.S. PATENT DOCUMENTS

| | | | |
|---|---|---|---|
| 6,577,587 B1 * | 6/2003 | Kishibe et al. | 720/700 |
| 6,971,622 B2 * | 12/2005 | Ziegler et al. | 248/454 |
| 7,011,285 B2 * | 3/2006 | Wang et al. | 248/673 |
| 7,595,994 B1 * | 9/2009 | Sun | 361/721 |
| 7,959,117 B2 * | 6/2011 | Chiu | 248/188.1 |
| 8,282,064 B2 * | 10/2012 | Li | 248/372.1 |
| 8,328,153 B2 * | 12/2012 | Yang et al. | 248/370 |
| 8,411,994 B2 * | 4/2013 | Takahashi | 382/276 |
| 2010/0051775 A1 * | 3/2010 | Wu et al. | 248/371 |
| 2010/0226088 A1 * | 9/2010 | Huang | 361/679.48 |

* cited by examiner

*Primary Examiner* — Todd M Epps
(74) *Attorney, Agent, or Firm* — Jackson IPG PLLC

(57) ABSTRACT

A tiltable notebook-computer cooling pad with a tablet-computer bracket is disclosed. The notebook-computer cooling pad has its bottom its bottom detachable assembled with a tablet-computer bracket that can provide tiltable and rotatable support. The tablet-computer bracket can work with the notebook-computer cooling pad to allow adjustment of a tilting angle of the notebook-computer cooling pad, or it can work independently as a stand-alone tablet-computer bracket that provides tiltable and rotatable support to a tablet computer. Thereby, the disclosed device can serve to not only maintain an operating notebook computer cool, but also support a tablet computer.

4 Claims, 7 Drawing Sheets

A

B

C

D

TILTABLE NOTEBOOK-COMPUTER COOLING PAD WITH TABLET-COMPUTER BRACKET

BACKGROUND OF THE INVENTION

1. Technical Field

The present invention relates to computer accessories, and more particularly, to a tiltable notebook-computer cooling pad with a tablet-computer bracket. The cooling pad is useful to heat dissipation for a notebook computer and also useful to support a tablet computer in use.

2. Description of Related Art

Notebook computers and tablet computers are the most popular forms of personal computer in addition to desktop computers. Notebook computers and tablet computers are designed to be particularly portable and work with the increasing popular wireless internet connection, so they are really portable devices. In recent years, with the joint efforts of engineers in the relevant field, notebook computers and tablet computers are becoming lighter, compacter, more endurant, and therefore portable. With the aid of the popularization of wireless internet accessibility, notebook computers and tablet computers can virtually be used anywhere and anytime, so they are extensively loved by computer users.

However, compactness somehow makes the heat-dissipating capability of such portable devices lower than that of other fixed devices, such as desktop computers and server computers. Conventionally, a notebook computer has its hard drive, CPU and power supply located near its back, so the back tends to heat up. Damages caused by the consequent heat accumulating effect are common.

For preventing a notebook computer from heat accumulation, various cooling pads of different materials, sizes and forms have been introduced to the market. When supporting a notebook computer, a cooling pad helps to dissipate heat by using one or more fans attached thereto.

In addition, a tablet computer is known as a pad-like computer, whose structure is streamlined and does not have any stands or supports to upright it for comfortable viewing. More and more modern computer users own both of a notebook computer and a tablet computer. For tilting and cooling the notebook computer and supporting and tilting the tablet computer, they have to buy and carry a notebook-computer cooling pad and a tablet-computer bracket. This is expensive and inconvenient.

SUMMARY OF THE INVENTION

In view of the problem that there is a lack of a cooling and supporting device useable to both of a notebook computer and a tablet computer, the present invention provides a tiltable notebook-computer cooling pad with a tablet-computer bracket.

According to the present invention, the notebook-computer cooling pad has its bottom detachable assembled with a tablet-computer bracket that can provide tiltable and rotatable support. The tablet-computer bracket can work with the notebook-computer cooling pad to allow adjustment of a tilting angle of the notebook-computer cooling pad, or it can work independently as a stand-alone tablet-computer bracket that provides tiltable and rotatable support to a tablet computer.

The detachable tablet-computer bracket, when separated from the notebook-computer cooling pad, can be overturned and presented as a stand-alone tablet-computer bracket that provides tiltable and rotatable support to a tablet-computer bracket.

Thereby, the disclosed device can serve to not only maintain an operating notebook computer cool, but also support a tablet computer, and is thus economic and usable to computer users.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Referring to FIG. 1 through FIG. 4, according to the present invention, a tiltable notebook-computer cooling pad with a tablet-computer bracket is depicted. The notebook-computer cooling pad 1 has is bottom formed with an accommodating recess 11 that is configured to receive a tablet-computer bracket 2.

Figure 5:
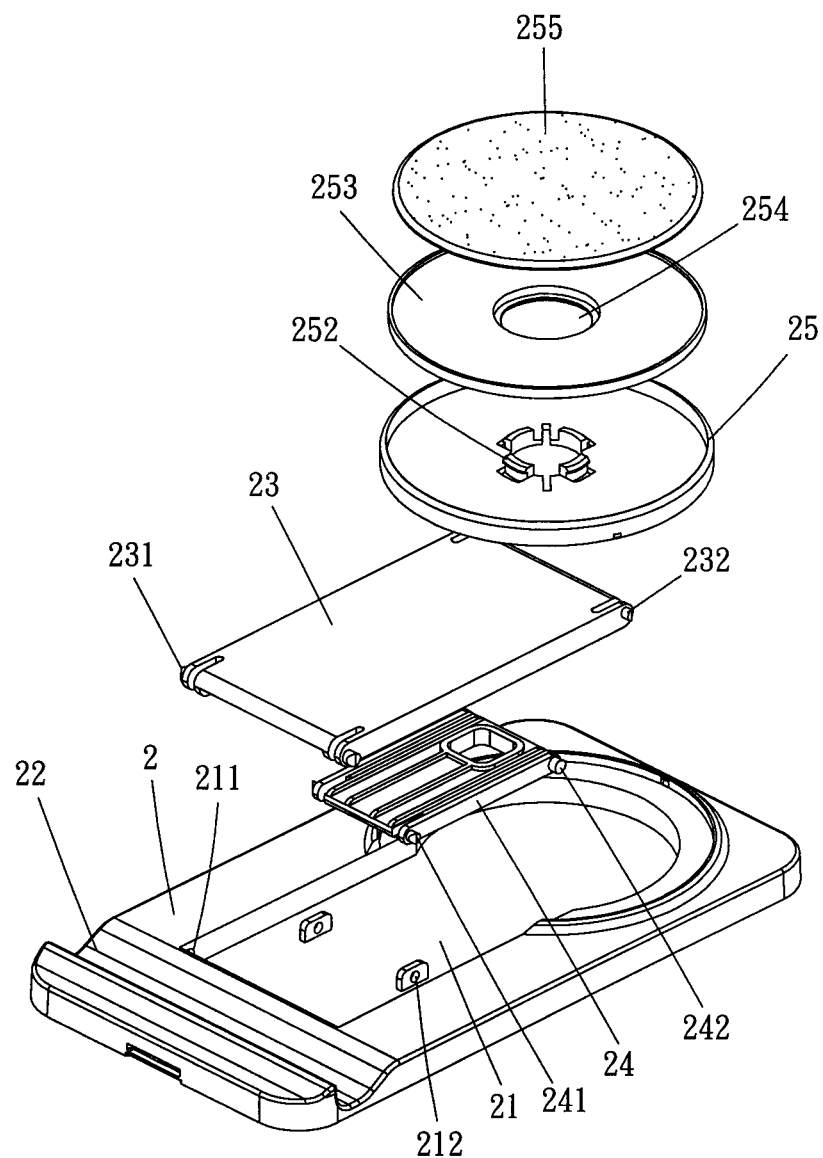
FIG. 5 is an exploded view of a tablet-computer bracket according to the present invention.
Figure 6:
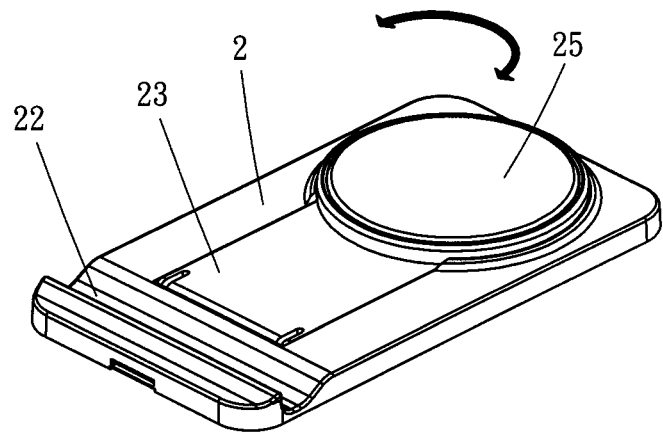
FIG. 6 a perspective view of the tablet-computer bracket in its retracted position.
Figure 7:
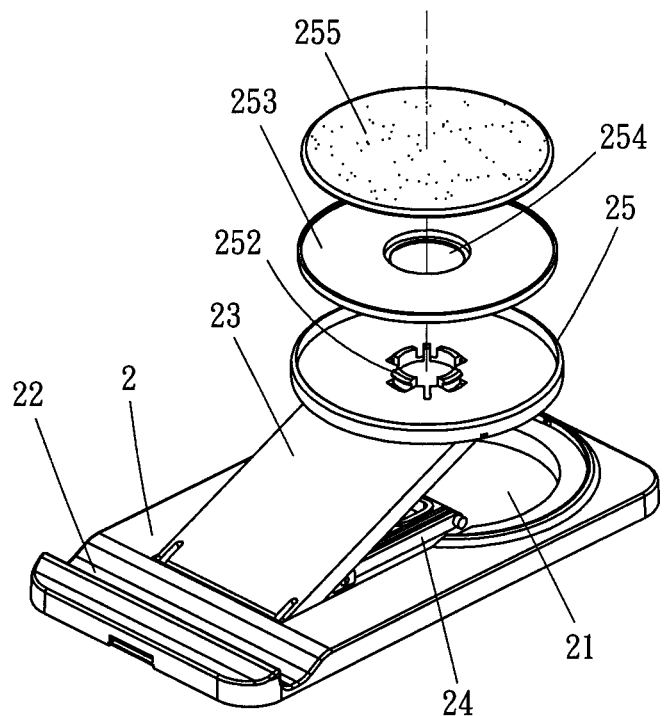
FIG. 7 is a partially exploded view of the tablet-computer bracket wherein the tablet-computer bracket is expanded.

Referring to FIG. 5 through FIG. 7, the tablet-computer bracket 2 is formed with a depressed portion 21 and a holding fillister 22. The depressed portion 21 pivotally receives a supporting board 23. The supporting board 23 has a lifting piece 24. A disc 25 is mounted on a free end of the supporting board 23. The supporting board 23 can hold the disc 25 at different tilting angles.

The supporting board 23 has its pivotal end coupled to pivotal holes 211 formed in the depressed portion 21 through a pair of pivots 231 flanking the pivotal end, so that the supporting board 23 is pivotable. The free end of the supporting board 23 is flanked by another two pivots 232 that connect pivotal holes 251 formed at two sides a back of the disc 25 so that the disc 25 is also pivotable.

In addition, a pair of pivotal holes 212 is provided in the depressed portion 21 for connecting pivots 241 at one end of the lifting piece 24, so that the lifting piece 24 is pivotable. Pivots 242 at an opposite end of the lifting piece 24 are slidably engaged with sliding rails 233 formed at a back of the supporting board 23 so that the lifting piece 24 is allowed to slide along the sliding rails 233 and get positioned by one pair of positioning holes 234 equidistantly formed in the sliding rails 233. In this manner, the supporting board 23 can be positioned at a desired tilting angle.

Referring to FIG. 5 through FIG. 7, the disc 25 is provided with an axle 252 around which a turntable 253 covered by a cushion 255 is mounted through its central hole 254. The disc 25 tilts with the supporting board 23 and the turntable 253 can rotate in either direction.

Figure 1:
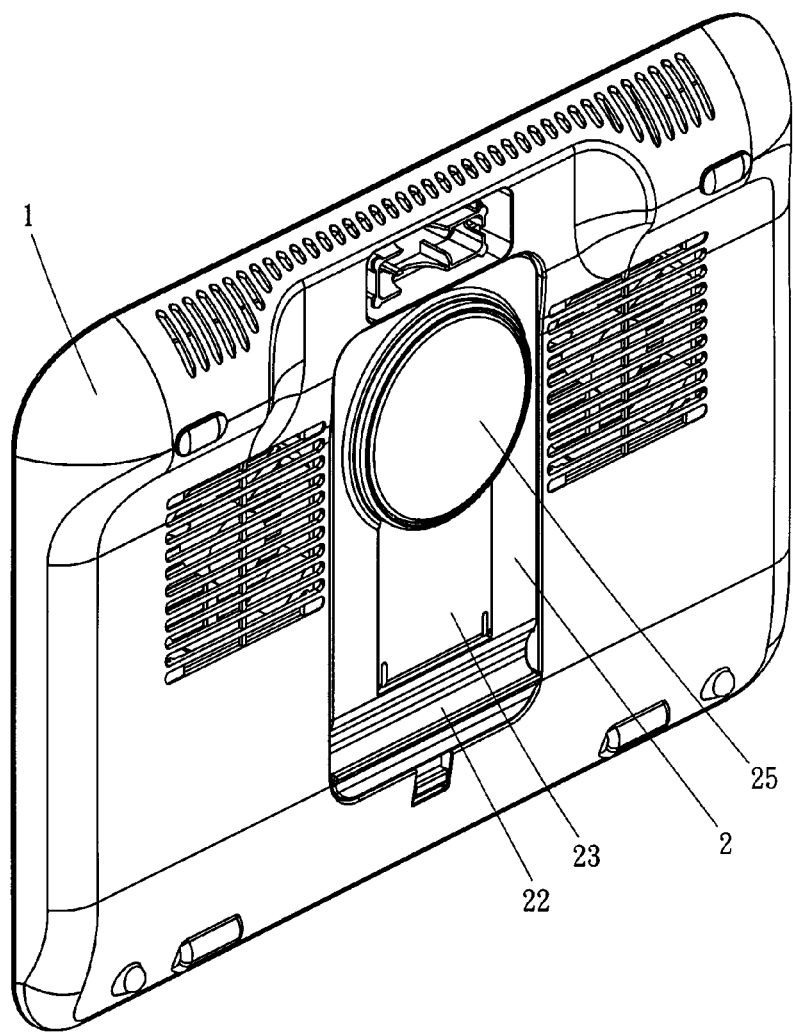
FIG. 1 is a rear perspective view of the present invention.
Figure 2:
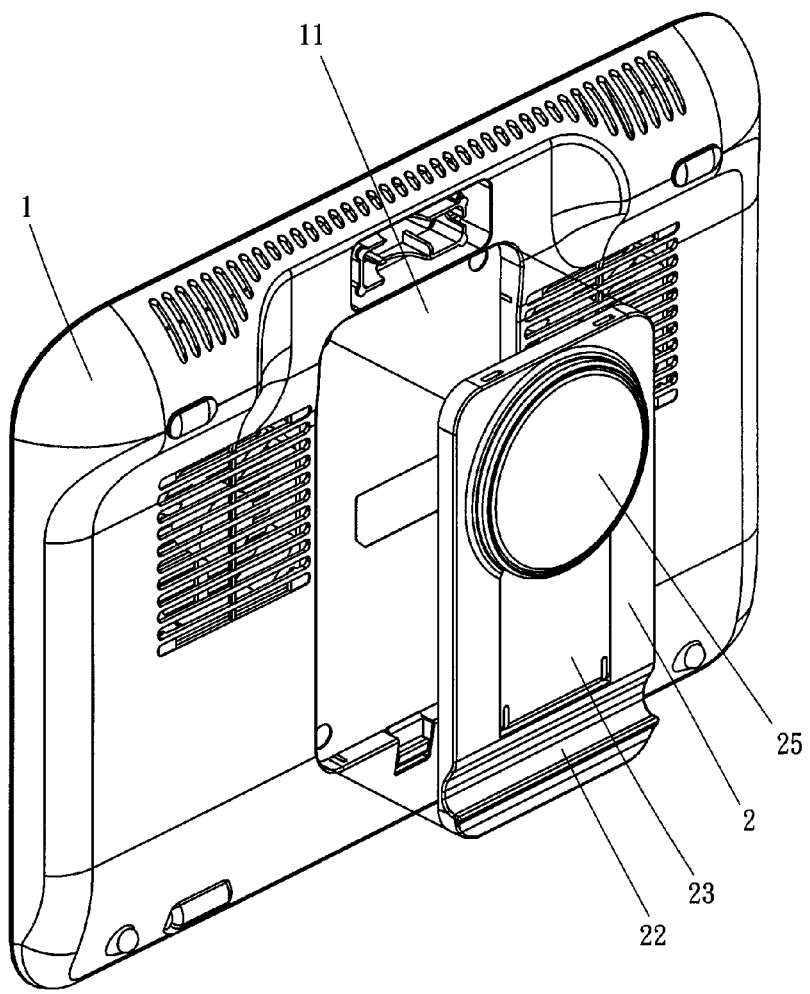
FIG. 2 is a rear disassembled view of the present invention.
Figure 3:
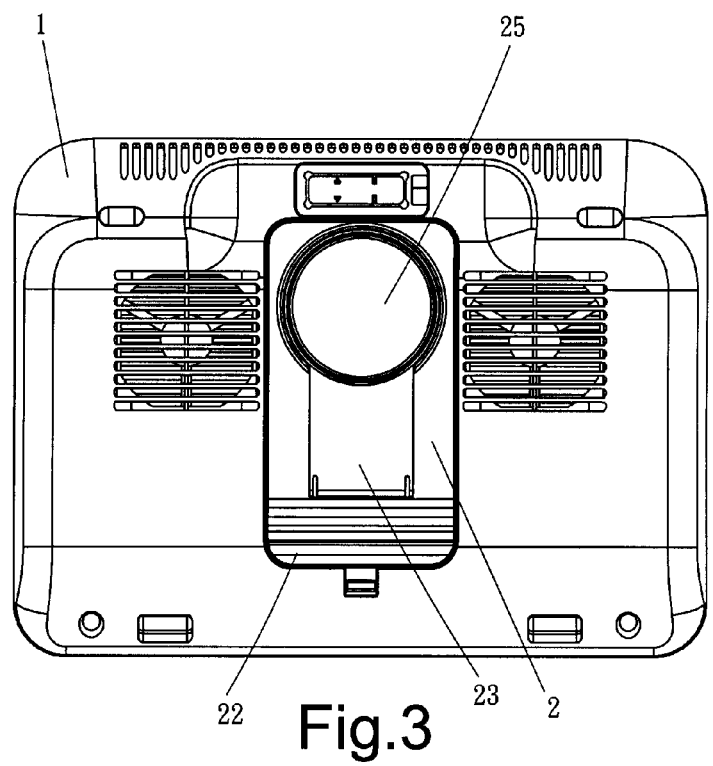
FIG. 3 is a rear plane view of the present invention.
Figure 4:
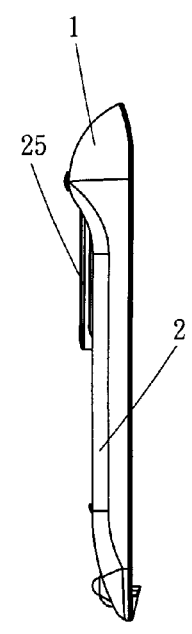
FIG. 4 is a lateral plane view of the present invention.
Figure 8:
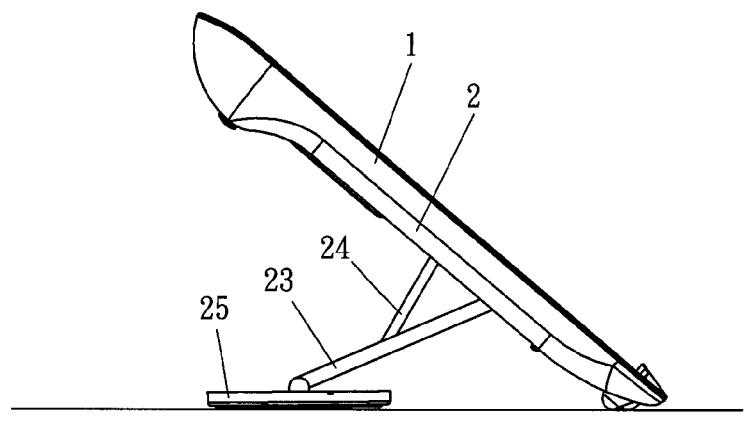
FIG. 8 are schematic drawings showing the tablet-computer bracket attached to and supporting the notebook-computer cooling pad at different tilting angles.
Figure 8:
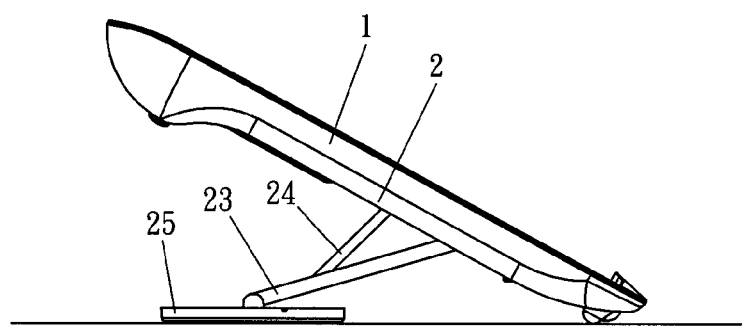
Figure 8:
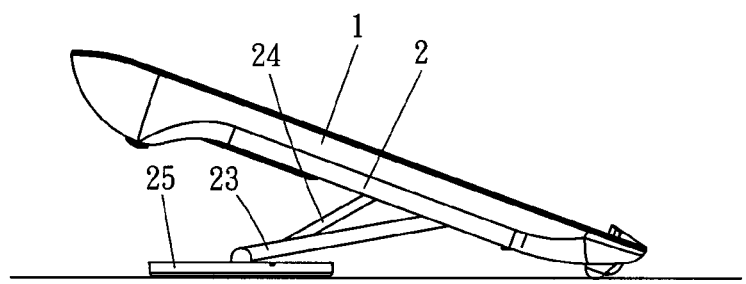
Figure 8:
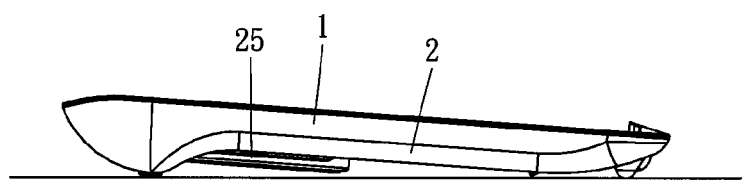

Referring to FIG. 1 and FIG. 8, in use, the tablet-computer bracket 2 is received in the accommodating recess 11 at the bottom of the notebook-computer cooling pad 1. The supporting board 23 and the disc 25 can be adjusted to a desired tilting angle, and then the disc 25 is rested on a plane or a desktop for holding the notebook-computer cooling pad 1 at the tilting angle so that a notebook computer supported by the notebook-computer cooling pad 1 is posed at a posture where it can be easily and ergonomically viewed by a computer user. Different tilting angles can be achieved as shown in FIG. 8 (A-D).

Figure 9:
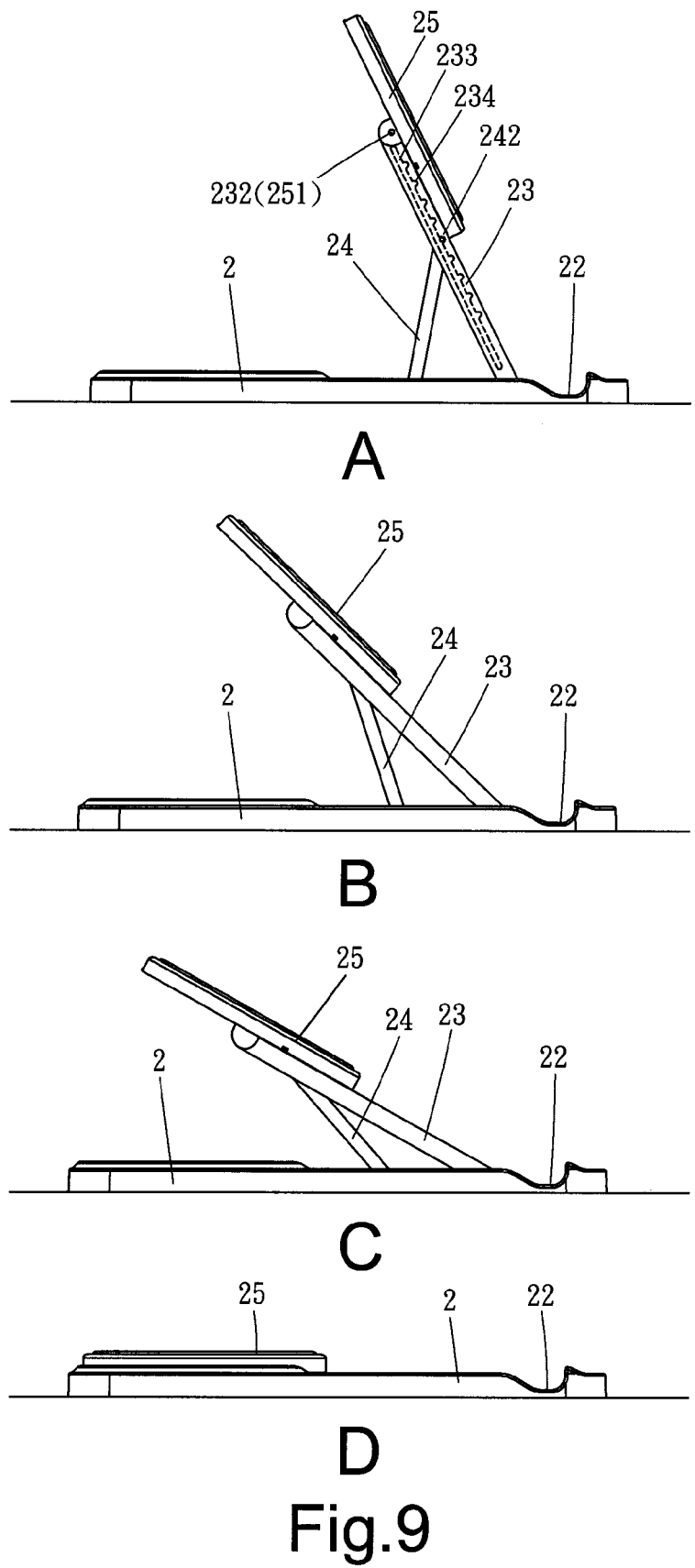
FIG. 9 are schematic drawings showing the tablet-computer bracket separated from the notebook-computer cooling pad and posed at different tilting angles.

Referring to FIG. 2, FIG. 5, FIG. 7 and FIG. 9, in an alternative use, the tablet-computer bracket 2 is removed from the accommodating recess 11 at the bottom of the notebook-computer cooling pad 1, and overturned to become a stand-alone tablet-computer bracket 2 that provides tiltable and rotatable support to a tablet computer. The overturned tablet-computer bracket 2 has its back rested on a plane or a desktop. Then the supporting board 23 and the disc 25 can pivot. At this time, a tablet computer may have its lower edge received in the holding fillister 22 and have its upper part leaning against the disc 25. Thereby, the tablet computer is posed at a posture where it can be ergonomically viewed by a computer user. Different tilting angles can be achieved as shown in FIG. 9 (A-D).

Accordingly, the present invention the disclosed device can serve to not only maintain an operating notebook computer cool, but also support a tablet computer, and is thus economic and usable to computer users.

What is claimed is:

1. A tiltable notebook-computer cooling pad with a tablet-computer bracket, the notebook-computer cooling pad having a bottom formed with an accommodating recess, and the tablet-computer bracket being removably received in the accommodating recess;
   wherein the tablet-computer bracket is formed with a depressed portion and a holding fillister, the depressed portion pivotally receiving a supporting board, the supporting board having a lifting piece, and a disc being mounted on one end of the supporting board and the supporting board is configured to hold the disc at different angles,
   wherein the disc has an axle,
   wherein a turntable with a central hole receives the axle and the turntable is thereby mounted on the disc,
   wherein the turntable is covered by a cushion.

2. The tiltable notebook-computer cooling pad of claim 1, wherein the supporting board has one end thereof coupled to pivotal holes formed in the depressed portion through a pair of pivots flanking the end of the supporting board, so that the supporting board is pivotable, while an opposite end of the supporting board is flanked by two pivots that connect pivotal holes formed at two sides a back of the disc so that the disc is also pivotable;
a pair of pivotal holes being provided in the depressed portion for connecting pivots at one end of the lifting piece, so that the lifting piece is pivotable, and pivots at an opposite end of the lifting piece being slidably engaged with sliding rails formed at a back of the supporting board so that the lifting piece is allowed to slide along the sliding rails and get positioned by one pair of positioning holes equidistantly formed in the sliding rails,
whereby the supporting board is positioned at a desired tilting angle.

3. The tiltable notebook-computer cooling pad of claim 1, wherein the tablet-computer bracket is received in the accommodating recess at the bottom of the notebook-computer cooling pad, and the supporting board and the disc are adjusted to a desired tilting angle, and then the disc being rested on a plane or a desktop for holding the notebook-computer cooling pad at the tilting angle so that a notebook computer supported by the notebook-computer cooling pad is posed at a posture where it is ergonomically viewed by a computer user.

4. The tiltable notebook-computer cooling pad of claim 1, wherein the tablet-computer bracket, the tablet-computer bracket is removed from the accommodating recess at the bottom of the notebook-computer cooling pad, and overturned to become a stand-alone tablet-computer bracket that provides tiltable and rotatable support to a tablet computer, the overturned tablet-computer bracket having its back rested on a plane or a desktop, then the supporting board and the disc pivoting, a tablet computer having a lower edge thereof received in the holding fillister and have an upper part thereof leaning against the disc, so that a tablet computer supported by the tablet-computer bracket is posed at a posture where it is ergonomically viewed by a computer user.

* * * * *